J. CAVANAGH.

METHOD OF MAKING SHOES.

APPLICATION FILED OCT. 1, 1917.

Reissued Mar. 25, 1919.

14,617.

INVENTOR-

James Cavanagh

UNITED STATES PATENT OFFICE.

JAMES CAVANAGH, OF BOSTON, MASSACHUSETTS, ASSIGNOR, BY MESNE ASSIGNMENTS, TO UNITED SHOE MACHINERY CORPORATION, OF PATERSON, NEW JERSEY, A CORPORATION OF NEW JERSEY.

METHOD OF MAKING SHOES.

14,617. Specification of Reissued Letters Patent. Reissued Mar. 25, 1919.

Original No. 1,197,603, dated September 12, 1916, Serial No. 876,241, filed December 9, 1914. Application for reissue filed October 1, 1917. Serial No. 194,243.

*To all whom it may concern:*

Be it known that I, JAMES CAVANAGH, a citizen of the United States, residing at Boston, in the county of Suffolk and State of Massachusetts, have invented new and useful Improvements in Methods of Making Shoes, of which the following is a specification.

The present invention relates to methods of making shoes and an object of the invention is to facilitate the manufacture of shoes and to reduce the cost thereof, particularly, in the making of welt and McKay shoes, by eliminating several of the skilled and costly operations incident to present shoe making methods.

A further object of the invention is to provide a method of manufacturing shoes which not only effects an economy in the manufacturing cost but also insures uniformity, both in the fit of the shoe and in its appearance.

Other objects and features of the invention will be apparent upon consideration of the following description and claims in connection with the accompanying drawings in which;

In carrying out the process of the invention the shoe upper 2, which is substantially of the usual form, is molded at the toe end to form a pocket for the toe end of the last and it is preferably also molded at the heel end. In the illustrated way of practising the invention the upper is molded together with the toe and heel stiffeners, to the shape which these parts have in a finished shoe, inturned toe and heel seat flanges being shown as molded into proper shape to prepare them for attachment of the upper to an insole.

Figure 1:
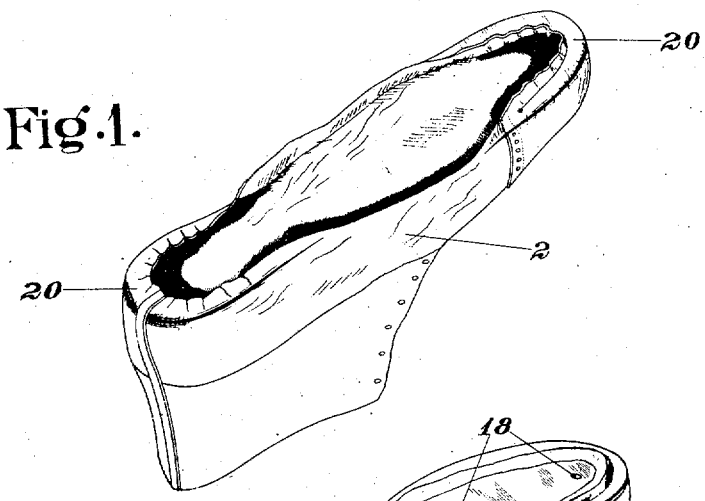
Figure 1 is a perspective view of a shoe upper prepared for assembling, together with an insole, upon a last in accordance with the present invention.
Figure 2:
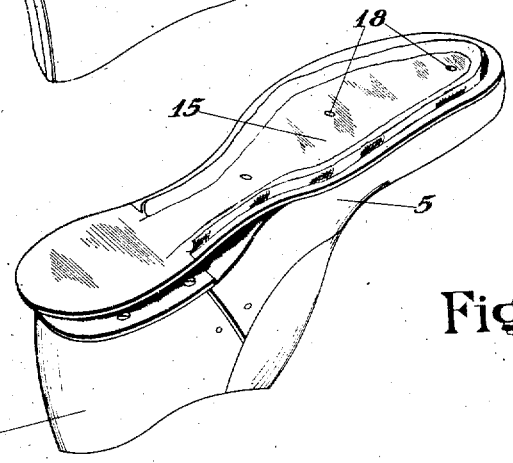
Fig. 2 is a perspective view of a last upon which the shoe may conveniently be made, an insole being secured thereon.
Figure 3:
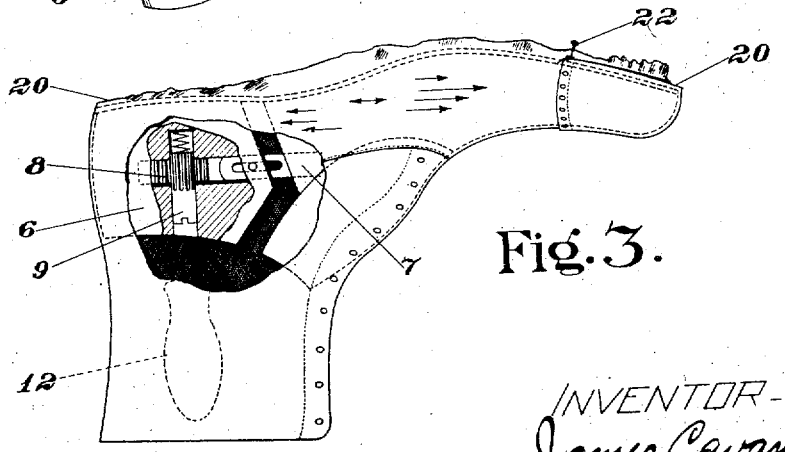
Fig. 3 is a side elevation, with certain portions broken away, showing the upper assembled upon the last.

The last employed in making a shoe according to the method of this invention is capable of assuming a position, for example, as shown in Fig. 2 in which it is somewhat shorter than the length of the shoe for which it is intended and is capable of being extended longitudinally to a predetermined size corresponding to the desired size of the finished shoe. A construction of last particularly adapted for use with the present invention comprises a forepart 5 and heel block 6 having a longitudinally extending socket into which fits a movable rack bar 8, the forward end of which is pivoted at 7 to the forepart 5 of the last. A pinion 9 located in a vertical socket in the heel block 6 engages said rack and may be rotated by a handle 12 to cause relative movement between the forepart and heel block in either direction. The insole to which the upper is secured is of the usual form employed in the manufacture of the commercial shoe and is herein shown by way of illustration as being an insole such as used in making a Goodyear welt shoe. In the illustrated preferred method of manufacturing this type of shoe the insole 15 which is of a size corresponding to that of the shoe, is secured to the forepart portion only of the shortened last by tacks 18, with the toe end of the insole flush with the toe end of the last and its heel portion extending beyond the rear end of the last. The molded upper 2 is then properly positioned on the last with its flanges 20 overlying the insole and the toe portion of the upper temporarily secured to the insole as by tacks 22, these tacks being shown as located approximately at the tip line on either side of the shoes thus preventing the "tip" from being displaced and also tending to cause the upper to hug the sides of the last during the later stretching operation. The last, which at this step in the process of manufacture is in shortened or collapsed position with the upper secured to the insole only at the toe portion, is then extended longitudinally by means of the handle 12 to a predetermined size corresponding to the size of the finished shoe to be produced. This has the effect of stretching the upper lengthwise of the last and conforming it to the lines of the last, particularly at the ball and along the sides, in manner similar to that in which such stretching is effected by machine pulling-over and lasting. If desired the heel end of the insole may remain outside the upper during the stretching of the shoe and may thereafter be tucked into place under the heel seat flange 20. For this purpose the upper must be assembled with the heel seat flange spaced above the tread face of the last far enough to allow the insole to be tucked in. I prefer, however, to assemble the work with the insole under both the toe and heel flanges and allow it to buckle upwardly in the shank. With the last remaining in lengthened position the heel seat portion of the upper will be tacked to the insole and the shoe may be side lasted and fastened as, for example, in accordance with the method described in my prior United States Letters Patent No. 1,163,596, granted Dec. 7, 1915; but in the manufacture of inexpensive shoes by the Goodyear welt process I believe it to be possible to omit the side lasting and satisfactorily draw the upper to the insole during the welting operation in which the usual welt is attached to the shoe as in the present commercial method of making shoes, and the shoe is then soled and finished in the usual manner. After the shoe has remained on the last long enough to "set" or acquire permanently the shape and size of the last, the last may be shortened and readily removed from the shoe without straining the seams of the shoe or destroying its shape and appearance.

It will be noted that this method permits the manufacture of shoes at a less cost and with greater facility than with the present commercial process since it substitutes for the skilled and therefore expensive lasting and pulling-over operations for shaping a shoe upper to a last, a molding operation and an upper stretching and drafting operation. The molding operation requires much less skill than does pulling-over and lasting and insures a more uniform and better appearing product with a relatively larger output for the same factor space and machinery equipment than can be secured by lasting the shoes in the usual manner; the lengthening of the last with the shoe upper thereon also enables the shoe upper to be stretched and conformed to the last in a sufficiently effective manner to take the place, in the manufacture of cheap footwear, of the stretching and conforming operations accomplished by pulling-over the shoe by hand or machine work. It will further be noted that by shortening the last after the shoe is finished the shoe is easily removed from the last without danger of stretching the upper or weakening the seams as frequently happens with the use of the commercial block last.

Having described my invention, what I claim as new and desire to secure by Letters Patent of the United States is:—

1. That improvement in the art of making shoes which consists in molding the toe portion of a shoe upper to substantially the shape which it is to have in the finished shoe, assembling an insole and said upper upon a collapsible last in collapsed position, extending said last to stretch and to draw the upper about said last, and then working the unmolded portion of the upper over upon said insole and securing it.

2. That improvement in the art of making shoes which consists in molding the upper and toe stiffening materials of the toe of a shoe upper to produce a toe pocket of substantially the shape which these parts have in the finished shoe, assembling an insole and said upper upon a longitudinally shortened last, temporarily securing the toe pocket at its sides to said insole, lengthening said last to stretch and draft the upper about said last, and sewing the marginal edge of said upper to said insole along the sides and around the forepart.

3. That improvement in the art of making shoes which consists in molding the toe portion of a shoe upper to substantially the shape which it is to have in the finished shoe including a flange inturned to extend over the feather of the insole, assembling an insole and said upper upon a last having its heel part displaced from its normal position in the shoe relatively to the forepart, returning the said heel and foreparts to their normal positions in the shoe, thereby stretching the upper to a predetermined size corresponding to the size of the finished shoe to be produced, inturning remaining portions of the marginal edge of said upper over upon said insole and securing them in inturned position, and then soling and finishing the shoe.

4. That improvement in the art of making shoes which consists in molding the toe and heel ends of a shoe upper to substantially the shape which these parts have in the finished shoe, providing an insole, securing the forepart of said insole to a longitudinally shortened last, assembling said upper upon the last, temporarily securing the toe portion of said upper to the insole, lengthening the last to stretch and draw the upper about said last, and lasting the marginal edge of said upper along the sides and heel portion of the last over upon the insole.

5. That improvement in the art of making shoes which consists in molding the toe portion of a shoe upper to substantially the shape which it is to have in the finished shoe assembling an insole and said upper upon a longitudinally shortened last, fastening the upper to the tread face of the insole to form a toe pocket and hold it in properly adjusted position at the tip line, lengthening said last and thereby stretching the upper to a predetermined size corresponding to the size of the finished shoe to be produced, and drawing the marginal edge of said upper over upon said insole and fastening a welt through said upper to the lip of the insole.

6. That improvement in the art of making shoes which consists in molding the toe and heel portions of a shoe upper to substantially the shape which it is to have in the finished shoe, assembling the upper together with an insole upon a longitudinally shortened last, fastening the toe and heel ends of the upper to the insole in properly adjusted position, lengthening the last to a predetermined size corresponding to the size of the finished shoe to be produced, and permanently securing the upper to the insole while the last is in lengthened position.

7. That improvement in the art of making shoes which consists in providing the toe portion of a shoe upper with a permanent pocket to receive the toe end of a last, applying an insole and a shoe upper to the last while it is in collapsed position and with the toe portion of the last located in said pocket, extending said last in the shoe upper to stretch and to draw said upper about the last and thereafter performing subsequent operations to complete the manufacture of the shoe.

8. That improvement in the art of making shoes which consists in permanently shaping the toe portion of a shoe upper in predetermined relation to the toe end of a collapsed last, applying an insole together with said upper to the collasped last while it is collapsed with the toe portion of the last positioned by the toe portion of the shoe upper, extending said last in the shoe upper to stretch and to draw the upper about said last, attaching the upper to the insole, and thereafter performing subsequent operations to complete the manufacture of the shoe.

9. That improvement in the art of making shoes which consists in molding the upper and toe stiffening materials of the toe of a shoe to substantially the shape which the parts have in the finished shoe, assembling an insole and said upper upon a longitudinally shortened last, lengthening said last, to stretch and to draw the upper about said last, and then working the unmolded portion of the marginal edge of the upper over upon said insole and securing it.

10. That improvement in the art of making shoes which consists in molding the upper and toe stiffening materials of the toe of a shoe upper to produce a toe pocket of substantially the shape which these parts have in the finished shoe, assembling an insole and said upper upon a longitudinally shortened last, temporarily securing the toe pocket at its sides to said insole, lengthening said last to stretch and draft the upper about said last, and sewing the marginal edge of said upper to said insole along the sides and around the forepart.

11. That improvement in the art of making shoes which consists in molding the toe portion of a shoe upper to substantially the shape which it is to have in the finished shoe including a flange inturned to extend over the feather of the insole, assembling an insole and said upper upon a longitudinally shortened last, lengthening said last and thereby stretching the upper to a predetermined size corresponding to the size of the finished shoe to be produced, inturning the remaining portions of the marginal edge of said upper over upon said insole and securing them in inturned position, anl then soling and finishing the shoe.

12. That improvement in the art of making shoes which consists in molding the toe portion of shoe upper materials including toe stiffening stock to produce a toe pocket having an inturned flange to lie over the feather and against the sewing rib of a welt shoe insole, assembling said upper with a welt insole upon a longitudinally shortened last, lengthening the last to stretch and draft the upper, attaching a welt to the shoe and drawing the margin of the upper along the sides of the shoe over the insole during the welting operation, and soling the shoe on the lengthened last.

13. That improvement in the art of making shoes which consists in molding the toe portion of shoe upper materials including toe stiffening stock to produce a toe pocket having an inturned flange to lie over the feather of an insole having a sewing rib and molding the heel portion of the upper materials including the heel stiffening stock to substantially the shape which these parts have in the finished shoe, assembling said upper with the insole upon a longitudinally shortened last, lengthening the last to stretch and draft the upper between said molded ends, attaching a welt to the shoe from the heel seat on one side around the toe to the heel seat on the other side and drawing the margin of the stretched upper along the sides of the shoe over the insole and fastening it during the welting operation, and soling the shoe, all while the shoe remains on the lengthened last.

In testimony whereof I have signed my name to the specification.

JAMES CAVANAGH.